(12) United States Patent
Furunaga et al.

(10) Patent No.: US 6,881,300 B2
(45) Date of Patent: Apr. 19, 2005

(54) SIZING AGENT AND RECORDING PAPER COMPRISING SIZING AGENT

(75) Inventors: Toshikatsu Furunaga, Tokyo (JP); Yoshiyuki Kondo, Nagano-ken (JP)

(73) Assignee: Space Environmental Technology Company, Inc., Tokyo (JP)

( * ) Notice: Subject to any disclaimer, the term of this patent is extended or adjusted under 35 U.S.C. 154(b) by 0 days.

(21) Appl. No.: 09/982,770

(22) Filed: Oct. 22, 2001

(65) Prior Publication Data

US 2002/0046820 A1 Apr. 25, 2002

Related U.S. Application Data

(62) Division of application No. 09/725,040, filed on Nov. 29, 2000.

(30) Foreign Application Priority Data

Dec. 2, 1999 (JP) .......................... 11-343922
Oct. 4, 2000 (JP) ........................ 2000-305381
Nov. 20, 2000 (JP) ........................ 2000-353578

(51) Int. Cl.⁷ .................. D21H 19/44; D21H 19/52
(52) U.S. Cl. .................. 162/168.1; 162/75; 162/164.6; 162/158; 162/176
(58) Field of Search ................. 162/75, 164.6, 162/168.1, 158, 176; 524/25, 56, 504; 525/54.2

(56) References Cited

U.S. PATENT DOCUMENTS 4,908,240 A * 3/1990 Auhorn et al. ............. 427/391
6,171,381 B1 * 1/2001 Yoshimura et al. ......... 106/31.6

FOREIGN PATENT DOCUMENTS

| FR | 1370325 | 7/1964 |
| JP | 59035977 A | 2/1984 |
| JP | 01135682 A | 5/1989 |
| JP | 06 182137 | 7/1994 |
| JP | 10119425 A | 5/1998 |

* cited by examiner

Primary Examiner—James J. Seidleck
Assistant Examiner—U.K Rajguru
(74) Attorney, Agent, or Firm—Sughrue Mion, PLLC

(57) ABSTRACT

A recording paper coated or impregnated with a sizing agent containing a water-soluble soybean polysaccharide as an indispensable component, and optionally a cationic polymer and a surfactant, preferably a nonionic surfactant having HLB of 5–15. The water-soluble soybean polysaccharide is a water-soluble polysaccharide extracted from soybean or soybean extraction residue and subjected to desalinating purification.

2 Claims, 2 Drawing Sheets

Cationic Polymer

Water-Soluble Soybean
Polysaccharide
(Minus-Charged Backbone)

Cationic Polymer

Water-Soluble Soybean Polysaccharide

⊖ :Surfactant

Water-Soluble Soybean Polysaccharide          Cationic Polymer

Water-Soluble Soybean Polysaccharide          Cationic Polymer

SIZING AGENT AND RECORDING PAPER COMPRISING SIZING AGENT

This is a divisional of application Ser. No. 09/725,040 filed Nov. 29, 2000, the disclosure of which is incorporated herein by reference.

FIELD OF THE INVENTION

The present invention relates to a sizing agent for providing inexpensive plain papers with high-quality, blur-free image excellent in printing concentration, color development and water resistance, particularly suitable for full-color inkjet printing papers. The present invention also relates to a recording paper comprising such a sizing agent.

BACKGROUND OF THE INVENTION

Inkjet printers are widely used not only as output means for personal computers, but also as means for printing on media of various materials. Widely used as inks for inkjet printers now are those composed of organic dyes dissolved in water or other solvents, and organic dyes include azo dyes, anthraquinone dyes, indigo dyes, phthalocyanine dyes, carbonium ion dyes, nitro dyes, quinoline dyes, naphthoquinone dyes, etc.

To clearly develop the color of the above inks while preventing the printed ink from blurring, so-called coated papers comprising ink-bearing layers made of high-water-absorption resins on surface, as disclosed by Japanese Patent Laid-Open Nos. 59-35977 and 1-135682, are used for inkjet printers. Such coated papers, however, are high in production cost because of special coatings, and lack in such hand as that of plain papers. Accordingly, demand is now mounting on commonly usable, inexpensive plain papers suitable for inkjet printers.

When a plain paper is used for an inkjet printer, however, the ink diffuses along fibers of the paper in the course of absorption into the paper, resulting in ink dots with excess blur, irregular peripheries, indistinct outlines, feathering, etc. Thus, clear letters and image cannot easily be obtained, causing the problem that image produced by an inkjet printer is insufficient in water resistance.

Against such a problem, Japanese Patent Laid-Open No. 10-119425 proposes a plain paper for inkjet printing, coated with a coating composition liquid comprising as effective components a cationic polymer and a water-soluble resin, the cationic polymer being a polymer consisting essentially of a quaternary ammonium salt of alkyl (meth)acrylamide having a benzyl group. However, the inkjet printing paper of Japanese Patent Laid-Open No. 10-119425 is insufficient in clarity of image and color development of ink when full-color inkjet printing is conducted. Therefore, further improvement of inkjet printing quality is desired.

OBJECT OF THE INVENTION

Accordingly, an object of the present invention is to provide a sizing agent with which plain papers are coated or impregnated to turn them to inexpensive recording papers excellent in printing concentration, color development and water resistance.

Another object of the present invention is to provide an inexpensive recording paper excellent in printing concentration, color development and water resistance, in which an ink attached onto a paper surface can quickly permeate thereinto while suppressing ink dots formed by ink drops from spreading, thereby providing high-quality image free from blur and visibility from a rear surface, particularly a recording paper suitable for full-color inkjet printing.

DISCLOSURE OF THE INVENTION

As a result of intensive research in view of the above objects, the inventors have found that the inclusion of a sizing agent comprising at least a water-soluble soybean polysaccharide provides a recording paper excellent in printing concentration, color development and water resistance and thus suitable for full-color inkjet printing. The present invention has been completed based on this finding.

The sizing agent according to the present invention comprises at least a water-soluble soybean polysaccharide.

The recording paper according to the present invention comprises fibrous pulp and a sizing agent comprising at least a water-soluble soybean polysaccharide. This recording paper can be produced by coating or impregnating a raw paper with a sizing agent comprising at least a water-soluble soybean polysaccharide.

In the present invention, the inclusion of a cationic polymer in the sizing agent is preferable to further improve the fixing and color development of ink. It is presumed that the water-soluble soybean polysaccharide attracts a cation of a cationic polymer having a minus-charged main chain, resulting in a pseudo-cross linking between the water-soluble soybean polysaccharide and the cationic polymer in the sizing agent as shown in FIG. 1. When only a cationic polymer is coated, most of the cationic polymer permeates into the inside of the paper. On the other hand, when a pseudo-cross-linked product of the water-soluble soybean polysaccharide and the cationic polymer is formed, the cationic polymer remains on a paper surface without penetrating inside the paper, resulting in improvement in ink fixing and color development even with a small amount of the cationic polymer.

To improve the water resistance of image, a surfactant is preferably added. The reason why the surfactant improves the water resistance of the recording paper is not necessarily clear, though it is presumed that a dye is insolubilized by the reaction shown in FIG. 2. First, because the hydrophobic group in side chains of the water-soluble soybean polysaccharide has affinity for a hydrophobic portion of the surfactant, the surfactant attaches to the side chains of the water-soluble soybean polysaccharide, such that the hydrophilic portion of the surfactant protrudes outward as shown in FIG. 2(a). Also, because the hydrophilic portion of the surfactant becomes close to the hydrophilic portion of the dye contained in the ink, the dye also becomes close to the water-soluble soybean polysaccharide (FIG. 2(b)). Thus, the dye is closely attracted to the cationic polymer pseudo-cross-linked with the water-soluble soybean polysaccharide, whereby the dye is insolubilized due to the bonding of the cation portion of the cationic polymer and the anion portion of the dye (FIG. 2(c)).

PREFERRED EMBODIMENTS OF THE INVENTION

Figure 1:
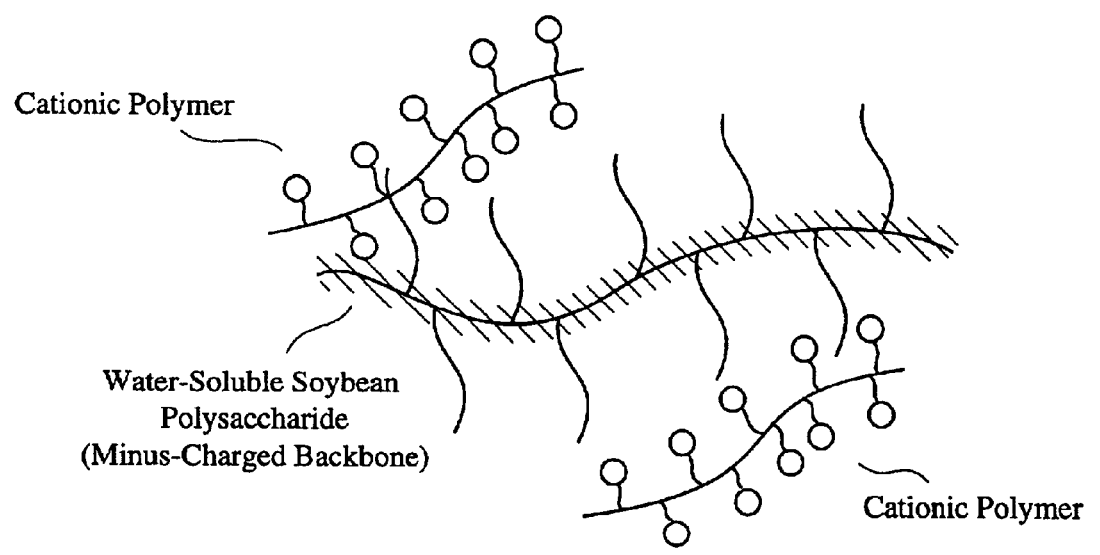
FIG. 1 is a schematic view showing a model of a pseudo-cross-linked product of the water-soluble soybean polysaccharide and the cationic polymer.
Figure 1:
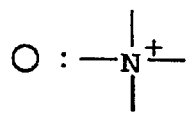
Figure 2A:
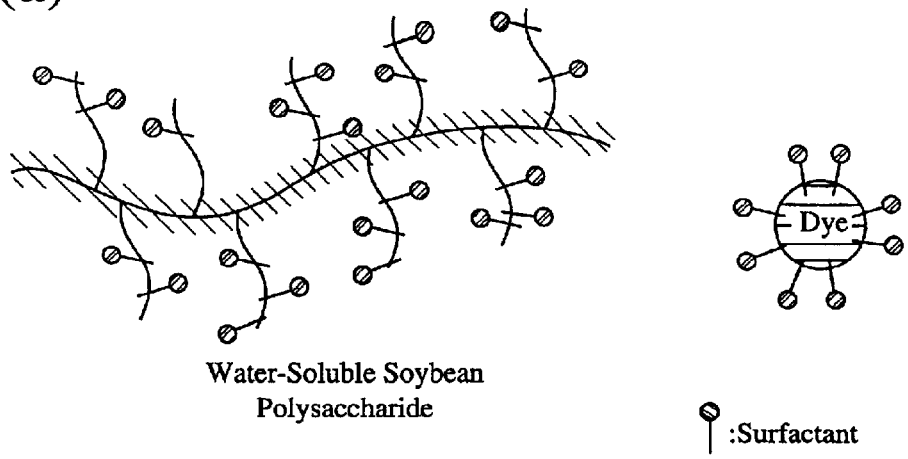
FIG. 2(a) is a schematic view of a reaction of insolubilizing a dye on a surface of the recording paper, showing that the surfactant attaches to the side chains of the water-soluble soybean polysaccharide such that the hydrophilic portion of the surfactant protrudes outward.
Figure 2B:
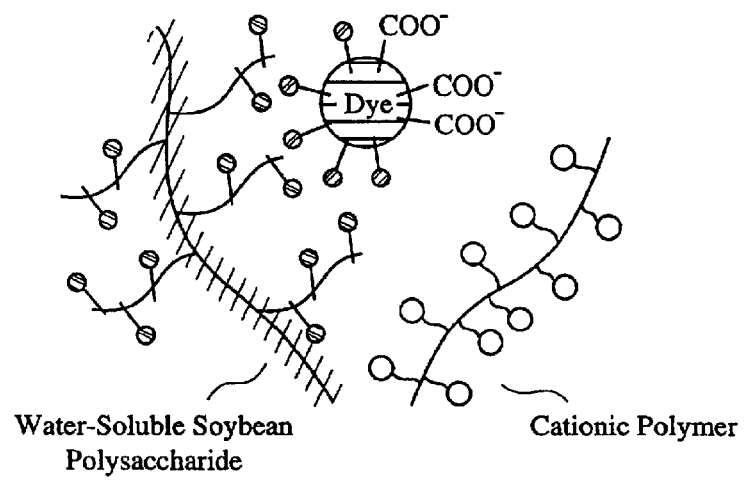
FIG. 2(b) is a schematic view of a reaction of insolubilizing a dye on a surface of the recording paper, showing that the dye becomes close to the water-soluble soybean polysaccharide.
Figure 2C:
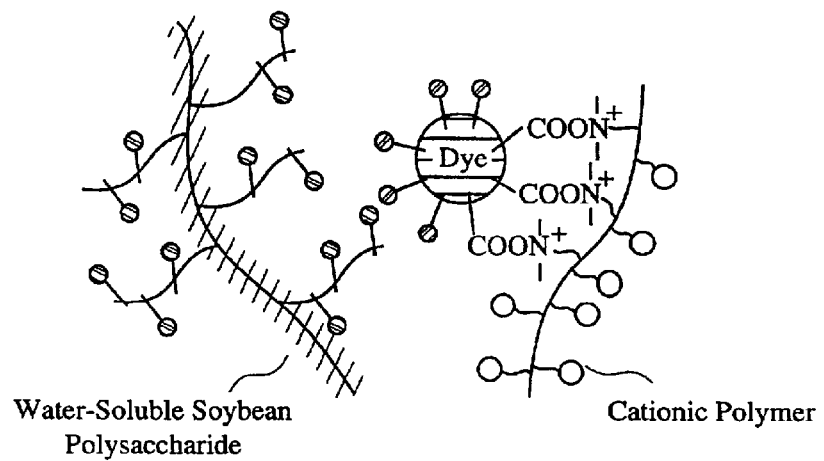
FIG. 2(c) is a schematic view of a reaction of insolubilizing a dye on a surface of the recording paper, showing that the dye is insolubilized due to the bonding of the cation portion of the cationic polymer and the anion portion of the dye.

The sizing agent and the recording paper of the present invention will be explained in detail below.

[A] Sizing agent

The sizing agent of the present invention comprises a water-soluble soybean polysaccharide as an indispensable component. To enhance the fixing and color development of ink, it is preferable to add a cationic polymer to the sizing agent, particularly to fix the cationic polymer to the water-soluble soybean polysaccharide. Also to improve the water resistance of ink, it is preferable to add a surfactant to the sizing agent of the present invention. Each component will be explained in detail below.

(1) Water-soluble soybean polysaccharide

The water-soluble soybean polysaccharide used in the present invention, a water-soluble polysaccharide extracted from soybean, comprises various types of polysaccharides such as galactose, arabinose, galacturonic acid, rhamnose, xylose, fucose, glucose, etc. It is presumed that the water-soluble soybean polysaccharide has a structure in which galactan and arabinan are bonded to the chain of rhamnogalacturonic acid, thereby having a main chain charged minus.

The raw materials from which the water-soluble soybean polysaccharide is extracted are preferably soybean cotyledon, more preferably so-called okara (soybean-curd refuse) by-produced in the course of producing tofu (soybean curd) or soybean protein. When these raw materials are treated with protein-decomposing enzyme or an alkali solution, proteins remaining in the raw materials are decomposed or dissolved in the solution. Therefore, by separating and removing the solution, the polysaccharide fraction contained in the raw materials can be concentrated.

Though the extraction of the water-soluble soybean polysaccharide may be carried out in any of an alkali, neutral or acidic solution, the solution is advantageously adjusted to pH of 4 or less, more preferably pH of 1–3 to simplify the adjustment of pH in the subsequent steps. For the purpose of adjustment of pH, acids such as hydrochloric acid, phosphoric acid, sulfuric acid, citric acid, oxalic acid, etc. may be used, and when citric acid or oxalic acid having a chelating action is used, the water-soluble soybean polysaccharide in a difficult-to-extract condition because of bonding to cell walls by a reaction with polyvalent cations such as calcium can easily be extracted, because the reactivity of polyvalent cations such as calcium is suppressed.

The extraction temperature is changeable depending on pH at the time of extraction, preferably 80° C. to 100° C. at pH of 3–4, 30° C. to 80° C. at pH of 2–3, and 20° C. to 80° C. at pH of less than 2. The extraction time is changeable depending on temperature and pH, though the elution of the polysaccharide is substantially completed in about 6 hours at 100° C. When the temperature is 30° C. to 80° C., extraction needs 6 hours or more at pH of 2–4, while the polysaccharide is fully extracted in about 6 hours at pH of less than 2. After the extraction of the water-soluble soybean polysaccharide, centrifugal separation and filtration are carried out to separate the extract liquid (polysaccharide fraction) from the okara residue.

To prevent the gelation of the water-soluble soybean polysaccharide, the separated polysaccharide fraction is preferably subjected to a purification treatment such as desalination in an acidic condition. Polyvalent cations such as calcium free in the polysaccharide fraction and raw materials participating in gelation are removed by desalinating purification. The desalinating purification may be carried out at pH of 0–4, preferably pH of 1–3. In such a pH range, the polyvalent cations bonded to the polysaccharide, which should be recovered, are made free and removed.

The desalinating purification methods include a reprecipitation method using a polar solvent such as methanol, ethanol, isopropanol, acetone, etc., an ultrafiltration method, a reverse osmosis method, a gel filtration method, a dialysis method, an ion-exchange resin method, an electric dialysis method, an ion-exchange membrane method, etc., and these methods may be conducted alone or in combination. Particularly, when a reprecipitation method with a polar solvent such as methanol, ethanol, isopropanol, acetone, etc., an ultrafiltration method, a reverse osmosis method, a gel filtration method or a dialysis method is used, various low-molecular weight compounds participating in gelation can advantageously be removed. The desalinating purification treatment is preferably carried out to the extent that ash components in the treated polysaccharide are 3% by weight or less, particularly 1–2% by weight.

(2) Cationic polymer

The cationic polymer is an optional component added to the sizing agent of the present invention. Coloring materials contained in the ink are associated with the cationic polymer in the recording paper due to ionic interaction during penetration into the inside of the paper, causing instantaneous separation from a liquid phase, thereby further improving the fixing and color development of the ink.

The cationic polymer usable in the present invention is a hydrophilic resin having a structure unit comprising a cation group, specifically hydrophilic synthetic resins such as acrylic resins, polyvinyl resins, polyallyl resins, etc. and natural-occurring resins such as cationized starch, etc. Particularly preferable among them are hydrophilic acrylic resins having quaternary amino groups as cation groups.

The hydrophilic, synthetic resin having a quaternary amino group can be produced by including (i) a structure unit having a quaternary amino group as an indispensable structure unit, and as optional components (ii) a structure unit derived from a hydrophilic acrylic, vinyl or allyl monomer, and/or (iii) a structure unit derived from a hydrophobic monomer.

The structure units (i)–(iii) will be explained in detail below.

(i) Structure Unit Having Quaternary Amino Group

The structure unit (i) is a segment contributing to the fixing of a dye. Here, the quaternary amino group is represented by the following general formula:

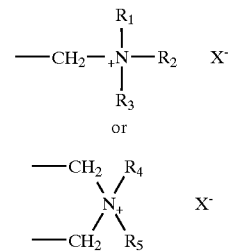

wherein $R_1$–$R_5$ are groups selected from the group consisting of alkyl groups having 1–7 carbon atoms, aryl groups, benzyl groups and combinations thereof, which may be the same or different, and $X^-$ is a counter ion such as a halogen group, etc.

The quaternary amino group can be obtained by adding a halogenated alkyl, etc. to an alkyl amino group. Specific examples of monomers forming the structure unit (i) are preferably N,N-dimethyl-aminoethyl (meth)acrylate.methyl chloride, N,N-dimethylaminopropyl (meth) acrylamide.methyl chloride, N,N-diallylmethylamine.methyl chloride, etc.

(ii) Structure unit derived from hydrophilic acrylic, vinyl or allyl monomer

The structure unit (ii) is a segment quickly absorbing water and a dye dissolved or dispersed in water, and specific examples of monomers forming the structure unit (ii) are preferably 1. Aliphatic carboxylic acids or anhydrides thereof such as acrylic acid, methacrylic acid, maleic acid, fumaric acid, itaconic acid, maleic anhydride, fumaric anhydride, itaconic anhydride, etc.;
2. Acrylamides such as (meth)acrylamide, dimethyl (meth) acrylamide, diethyl (meth)acrylamide, (meth)acryloil morpholine, N,N-dimethylaminopropyl (meth) acrylamide, (meth)acrylamide-t-butyl sulfonic acid, etc.;
3. Phosphoric acid group-containing acrylic monomers such as mono(2-methacryloiloxyethyl) acid phosphate, mono (2-acryloiloxyethyl) acid phosphate, etc.; and
4. Vinylpyrrolidones such as N-vinyl-2-pyrrolidone, etc.

(iii) Structure unit derived from hydrophobic monomer

The structure unit (iii) is a segment imparting water resistance to the cationic polymer, which may be included in such a range as not to extremely hinder the hydrophilic properties of the cationic polymer. Monomers forming the structure unit (iii) are not particularly restrictive as long as they do not contain hydrophilic groups. Also, even monomers having hydrophilic groups (—OH, etc.) or hydrophilic portions (—O—,etc.) can form a hydrophobic portion of the cationic polymer, as long as they have hydrophobic groups having 4 or more carbon atoms. The number of carbon atoms in such hydrophobic groups is preferably 6 or more. Specific examples of such hydrophobic groups are long-chain alkyl groups, long-chain alkylene groups, aromatic groups, etc.

(iv) Percentage of each structure unit

The percentages of the above structure units (i)–(iii), ratios of monomers used, are preferably such that (i) is 30–100% by weight, (ii) is 0–50% by weight, and (iii) is 0–30% by weight, more preferably that (i) is 70–100% by weight, (ii) is 0–30% by weight, and (iii) is 0–20% by weight.

(v) Addition of cationic polymer

The cationic polymer may be added directly to the sizing agent of the present invention or may be fixed to the water-soluble soybean polysaccharide. When it is directly added to the sizing agent, the cationic polymer preferably has an average molecular weight of about 10,000–30,000, because a cationic polymer with a higher average molecular weight is high in viscosity and thus poor in coatability. Alternatively, when the cationic polymer is fixed to the water-soluble soybean polysaccharidle, the cationic polymer is preferably graft-polymerized to the water-soluble soybean polysaccharide. The graft polymerization can be carried out by adding the cationic polymer in a state of monomer and a known polymerization initiator to a solution of the water-soluble soybean polysaccharide to cause reaction therebetween.

(3) Surfactant

The surfactants may be anionic, cationic, amphoteric or nonionic, and nonionic surfactants are particularly effective. The addition of a surfactant improves the water resistance of image with enhanced image concentration and suppressed bleeding.

Specific examples of the nonionic surfactants are adducts of higher alcohols and ethylene oxide, adducts of alkyl phenols and ethylene oxide, adducts of aliphatic acids and ethylene oxide, adducts of polyvalent alcohol aliphatic esters and ethylene oxide, adducts of higher alkyl amines and ethylene oxide, adducts of aliphatic amides and ethylene oxide, adducts of oils and ethylene oxide, adducts of polypropylene glycol and ethylene oxide, aliphatic esters of glycerol, aliphatic esters of pentaerythritol, aliphatic esters of sorbitol or sorbitan, aliphatic esters of sucrose, alkyl ethers of polyvalent alcohols, aliphatic amides of alkanol amines, etc.

The polyvalent alcohols in the above-exemplified compounds may be glycerol, trimethylol propane, pentaerythritol, sorbitol, sucrose, etc., though they are not restrictive.

With respect to the ethylene oxide adducts, part of ethylene oxide may effectively be substituted by alkylene oxides such as propylene oxide or butylene oxide in a range that the ethylene oxide adducts keep water solubility. The substitution ratio is preferably 50% or less.

The nonionic surfactants used in the present invention preferably have HLB of 5–15, particularly 7–13.

Such nonionic surfactants are commercially available under the tradenames of, for instance, Brownon BR-32, Brownon BR-35, Brownon CW-40, Brownon N-506, Brownon N-509, Brownon EL-1509, Brownon L-210, Brownon P-303, available from Aoki Oil Industrial Co., Ltd.; Noigen EA-120, Noigen EA-80, Noigen ET-135, Noigen ET-129 available from Dai-ichi Kogyo Seiyaku Co., Ltd.; Adekapurlonic L-43, Adekapurlonic L-44, Adekapurlonic P-75, Adekapurlonic P-94, Adekapurlonic TR-704, etc. available from Asahi Denka Kogyo K. K. ; and Pepol B-184, Pepol D-304, Pepol BS-184, etc. available from Toho Chemical Industries Co., Ltd.

(4) Composition of sizing agent

In the present invention, the weight ratio of the surfactant to the water-soluble soybean polysaccharide is 0.05–200, preferably 0.1–10, more preferably 0.5–5. Also, the weight ratio of the cationic polymer to the water-soluble soybean polysaccharide is 0–50, preferably 0.5–20, more preferably 1–10.

The mixture of the above components is diluted with a solvent such as water to a concentration suitable for sizing. The concentration of the sizing agent is 0.5–20%, preferably 1–10%, more preferably 2–5% by dry weight on a solid basis.

(5) Other components

The sizing agent of the present invention may include other components than the water-soluble soybean polysaccharide, the cationic polymer and the surfactant, in ranges as not to deteriorate the effects of the present invention. The other components added to the sizing agent are alumina powder, silica powder, natural inorganic powder, water-soluble resins, resin emulsions, pH-adjusting agents, antiseptics, anti-oxidants, etc.

The water-soluble resins may be, for instance, starch, polyacrylamide, polyvinyl pyrrolidone, water-soluble cellulose (carboxymethyl cellulose, hydroxymethyl cellulose, hydroxypropyl cellulose, etc.), polyvinyl methylether, polyethylene oxide, polyvinyl alcohol, etc.

[B] Recording paper

The recording paper of the present invention is a paper impregnated or coated with the sizing agent of the present invention at the stage of a raw paper or in a paper-producing process. The sizing agent of the present invention may be added to a paper slurry in advance as an inner sizing agent, though it is not preferable because it needs a large amount of a sizing agent to exhibit sufficient effects.

The raw paper used in the present invention is based on chemical pulp such as LBKP, NBKP, etc. and fillers, including an inner sizing agent and a paper-producing aide, if necessary. The raw paper is formed into a plain paper by a usual method. Pulp usable in the present invention may be mechanical pulp or pulp regenerated from used papers, or pulp containing them as main components. The fillers may be calcium carbonate, kaolin, talc, titanium dioxide, etc. The sizing agent of the present invention is applied or impregnated to the above raw paper in an amount of 1–20 g/m² on a solid basis.

The recording paper treated with the sizing agent of the present invention is preferably adjusted to have a water extraction pH of 5–9, more preferably 6–8. The water extraction pH is defined as pH (measured according to JIS-Z-8802) of an extract obtained by immersing 1.0 g of a test piece (defined by JIS-P-8133) in 70 ml of distilled water.

The recording paper of the present invention is not substantially different from conventional neutral PPC papers with respect to surface conditions and physical properties except for recording properties. Therefore, the recording papers of the present invention can be used as toner-bearing papers for electrophotography and inkjet printing papers.

The present invention will be explained in further detail by the following EXAMPLES without intention of restricting the scope of the present invention defined by the claims attached hereto.

EXAMPLES 1–8

Comparative Examples 1 and 2

A raw paper having a basis weight of 70 g/m² was coated with a sizing agent having a composition shown in Table 1 by a bar coater in an amount of 5 g/m² on a solid basis, and dried at 120° C. for 5 minutes in an oven.

TABLE 1

Composition of Sizing Agent (parts by weight on a solid basis)

| EXAMPLE No. | 1 | 2 | 3 | 4 |
|---|---|---|---|---|
| Water-Soluble Soybean Polysaccharide | 2.5[(1)] | 2.0[(1)] | 0.3[(1)] | 1.0[(2)] |
| Cationic Polymer | — | 1.4[(3)] | 2.7[(4)] | 3.0[(3)] |
| Alumina[(5)] | 0.5 | 0.6 | — | 1.0 |
| Surfactant | — | — | — | — |
| Water | 97 | 96 | 97 | 95 |

| EXAMPLE No. | 5 | 6 | 7 | 8 |
|---|---|---|---|---|
| Water-Soluble Soybean Polysaccharide[(1)] | 1.2 | 1.2 | 1.2 | 1.2 |
| Cationic Polymer[(4)] | 1.2 | 1.2 | 1.2 | 1.2 |
| Alumina[(5)] | 0.6 | 0.6 | 0.6 | 0.6 |
| Surfactant[(6)] | — | 0.03 | 0.3 | 1.2 |
| Water | 97 | 96.97 | 96.7 | 95.8 |

Note:
[(1)]Tradename "Soyafive S-DN," available from Fuji Oil Co., Ltd.
[(2)]Water-soluble soybean polysaccharide fixed with a cationic polymer obtained by adding 10 parts by weight of a water-soluble soybean polysaccharide ("Soyafive S-LA200," available from Fuji Oil), and 10 parts by weight of N,N-dimethylaminoethyl acrylate. methyl chloride, both on a solid basis, to 80 parts by weight of water, and causing reaction there between at 60° C. for 8 hours in the presence of 0.5% by weight of a polymerization catalyst [2,2'-azobis (2-methyl propionic amide) dihydrochloride] based on N,N-dimethylaminoethyl acrylate.methyl chloride.
[(3)]Cationic polymer obtained by polymerizing N,N-diallylmethylamine acrylate.methyl chloride in a 30% concentration.
[(4)]Viscous cationic polymer obtained by polymerizing a mixture of 70 parts by weight of N,N-dimethylaminoethyl acrylate.methyl chloride and 30 parts by weight of dimethyl acrylamide in a 15% concentration.
[(5)]Easily sinterable, low-sodium alumina (Tradename "AES-12," available from Sumitomo Chemical Co., Ltd.).
[(6)]Nonyl phenol ("Brownon N-509," HLB of 12.8 available from Aoki Oil Industrial Co., Ltd.).

Each recording paper thus obtained in EXAMPLES 1–8 was used for full-color printing with an inkjet printer (color bubble-jet printer "BJ F600," available from Canon Inc.).

Also, as Comparative Examples, full-color printing was conducted using a commercially available plain paper ("New Printer Paper CP-250," available from Canon, COMPARATIVE EXAMPLE 1), and a commercially available coated paper ("Photo-Gloss Paper GP-301 for color BJ" available from Canon, COMPARATIVE EXAMPLE 2).

Printed samples were evaluated with respect to color development and water resistance. The color development was measured using a color differential calorimeter ("CR200," available from Minolta Co., Ltd.). The water resistance was evaluated by measuring by the naked eye the blur of image on a sample that was immersed in water for 10 seconds after printing and taken out of water quickly. The evaluation standards of the water resistance were as follows:

⊚: Completely no blur.

○: Slight elution of ink into water, with no blur of ink on the paper.

Δ: Slight blur of ink on both surfaces of the paper.

X: Extreme blur of ink on both surfaces of the paper.

The results are shown in Table 2.

TABLE 2

Results of Evaluation

| | Color Development of Ink | | | Water |
| No. | Red | Yellow | Blue | Resistance |
|---|---|---|---|---|
| EXAMPLE 1 | 71 | 86 | 55 | Δ |
| EXAMPLE 2 | 74 | 87 | 57 | Δ |
| EXAMPLE 3 | 71 | 85 | 53 | Δ |
| EXAMPLE 4 | 73 | 87 | 56 | Δ |
| EXAMPLE 5 | 71 | 86 | 55 | Δ |
| EXAMPLE 6 | 72 | 89 | 58 | ⊚ |
| EXAMPLE 7 | 74 | 87 | 58 | ⊚ |
| EXAMPLE 8 | 73 | 87 | 57 | ⊚ |
| COM. EX. 1 | 59 | 85 | 45 | X |
| COM. EX. 2 | 73 | 89 | 57 | ○ |

As is clear from Table 2, in EXAMPLES 1–8 using the sizing agent of the present invention, excellent color development was achieved in all colors, not so poorer than in the case of the coated paper in COMPARATIVE EXAMPLE 2. Also, in EXAMPLES 6–8 containing the surfactant, the water resistance was improved, better than in the case of the coated paper in COMPARATIVE EXAMPLE 2.

As described in detail above, the sizing agent of the present invention can provide inexpensive recording papers excellent in ink concentration, color development and water resistance, which can produce high-quality image free from blur and visibility from a rear surface, and thus particularly suitable for full-color inkjet printing, because ink attached to a paper surface quickly penetrates into the inside of the paper while suppressing ink dots formed by ink drops on a paper surface from spreading. Because the recording papers of the present invention are not subjected to drastic modifications in surface conditions and physical properties unlike the coated papers, they can be used as toner-bearing papers for electrophotography and inkjet printing papers.

What is claimed is:

1. A recording paper impregnated with a sizing agent comprising a water-soluble soybean polysaccharide, a cationic polymer and a surfactant, whereby when said paper is subjected to inkjet printing, ink attached to a paper surface quickly penetrates into the inside of the paper while suppressing ink dots formed by ink drops on a paper surface from spreading.

2. The recording paper according to claim 1, wherein said sizing agent further comprises an inorganic filler.

* * * * *